United States Patent [19]

Kueffer et al.

[11] Patent Number: 5,000,851

[45] Date of Patent: Mar. 19, 1991

[54] TURBINE FILTER WITH PRESSURE SEAL BONNET

[75] Inventors: Max Kueffer, Blue Bell; Roy L. Feiss, Southampton, both of Pa.

[73] Assignee: Keystone International Holdings Corp., Wilmington, Del.

[21] Appl. No.: 486,962

[22] Filed: Mar. 1, 1990

[51] Int. Cl.$^5$ .............................................. B01D 27/00
[52] U.S. Cl. ...................................... 210/452; 55/480
[58] Field of Search ............... 210/445, 447, 450, 451, 210/452, 453, 454; 55/480, 481

[56] References Cited

U.S. PATENT DOCUMENTS

| | | | |
|---|---|---|---|
| 2,050,606 | 8/1936 | Gray | 210/447 |
| 3,155,614 | 11/1964 | Wendlenner | 210/452 |
| 4,544,387 | 10/1985 | Agerlid | 210/450 |
| 4,946,598 | 8/1990 | Murphy et al. | 210/452 |

OTHER PUBLICATIONS

Threaded, Socket-Welding and Flanged Strainers, Yarway Corp. Strainers for Pressure up to 1500 psi, Yarway Corp, 1965-66.
The Integral Strainer Trap with Quick-Change Trim, Yarway Corp., 1966.
Integral Strainer Impulse Steam Traps, Yarway Corp, 1963-1966.
Guide for the Selection, Installation and Maintenance of Pipe Line Strainers; Pipe Line Strainer, Separator and Filter Section Fluid Controls Institute Inc., Apr. 27, 1971.

Primary Examiner—Bernard Nozick
Attorney, Agent, or Firm—Ferrill and Logan

[57] ABSTRACT

A strainer for preventing debris from entering a turbine. The strainer comprises a casing having an inlet conduit for introducing a flow medium into said strainer and an outlet conduit extending substantially perpendicular to said inlet conduit for expelling said flow medium, said outlet conduit having conically expanding interior side walls; an annular seal affixed to said casing between said inlet and outlet conduits for forming a seal between said inlet and outlet conduits; a bonnet attached to said casing, said bonnet having an upper bonnet section affixed to said casing and hollow cylindrical lower bonnet cage which mates with said annular seat, said hollow cylindrical lower bonnet cage opening into said outlet conduit and having a plurality of apertures so as to permit flow into said hollow cavity and out said outlet conduit and strainer screen means surrounding said hollow cylindrical lower bonnet, said screen means preventing debris from entering said apertures.

12 Claims, 3 Drawing Sheets

TURBINE FILTER WITH PRESSURE SEAL BONNET

FIELD OF THE INVENTION

The present invention is directed to an improved high pressure strainer design. Specifically, the present invention is directed to an improved high pressure strainer for protecting high, intermediate, and low pressure turbines from debris entering those machines.

BACKGROUND OF THE INVENTION

The present invention is directed to a strainer designed to protect high, intermediate, and low pressure turbines from debris. Strainers are an important component in valves, traps and similar equipment. A pipe line strainer is a device which, when installed in a pipe line, provides a means of mechanically removing solids from a flowing fluid or gas by utilizing a perforated or mesh straining element. Strainers are generally employed in pipelines to protect mechanical equipment such as condensers, heat exchangers, meters, spray nozzles and turbines from the detrimental effects of sediment, rust, pipe scale or other extraneous debris.

There have been numerous types of prior art steam strainers. Two of the more common types of these devices are the Y-type strainer and bucket strainer. Prior art strainers have typically experienced several problems. First, they frequently do not provide smooth flow characteristics and often leak. Secondly, prior art strainers typically incorporate thin screens which can become distorted over time due to the flow of debris. Finally, prior art strainers can be difficult to remove or adjust.

The present invention is directed to an improved strainer for preventing debris from entering a turbine. The strainer of the present invention exhibits improved flow characteristics, does not buckle under pressure, and does not produce a significant reduction or loss in operating pressure.

It is an object of the present invention to provide a strainer which provides smooth flow characteristics.

It is still a further object of the present invention to provide a strainer which includes a labyrinth seal to provide a tight seal and to prevent leakage.

It is still a further object of the present invention to provide a strainer in which a bonnet cage supports the screen.

It is an additional object of the present invention to provide a pressure strainer in which circumferential grooves around the bonnet cage increase the total free flow area and thereby reduce pressure loss.

SUMMARY OF THE INVENTION

In accordance with the present invention, a strainer for preventing debris from entering a turbine and reaching critical turbine surfaces. The strainer comprises a casing having an inlet conduit for introducing a flow medium into said strainer and an outlet conduit extending substantially perpendicular to said inlet conduit for expelling said flow medium, said outlet conduit having conically expanding interior side walls; an annular seal affixed to said casing between said inlet and outlet conduits for forming a seal between said inlet and outlet conduits a bonnet attached to said casing, said bonnet having an upper bonnet section affixed to said casing and hollow cylindrical lower bonnet cage which mates with said annular seat, said hollow cylindrical lower bonnet cage opening into said outlet conduit and having a plurality of apertures so as to permit flow into said hollow cavity and out said outlet conduit and strainer screen means surrounding said hollow cylindrical lower bonnet, said screen means preventing debris from entering said apertures.

DETAILED DESCRIPTION OF THE PREFERRED EMBODIMENT

Figure 1:
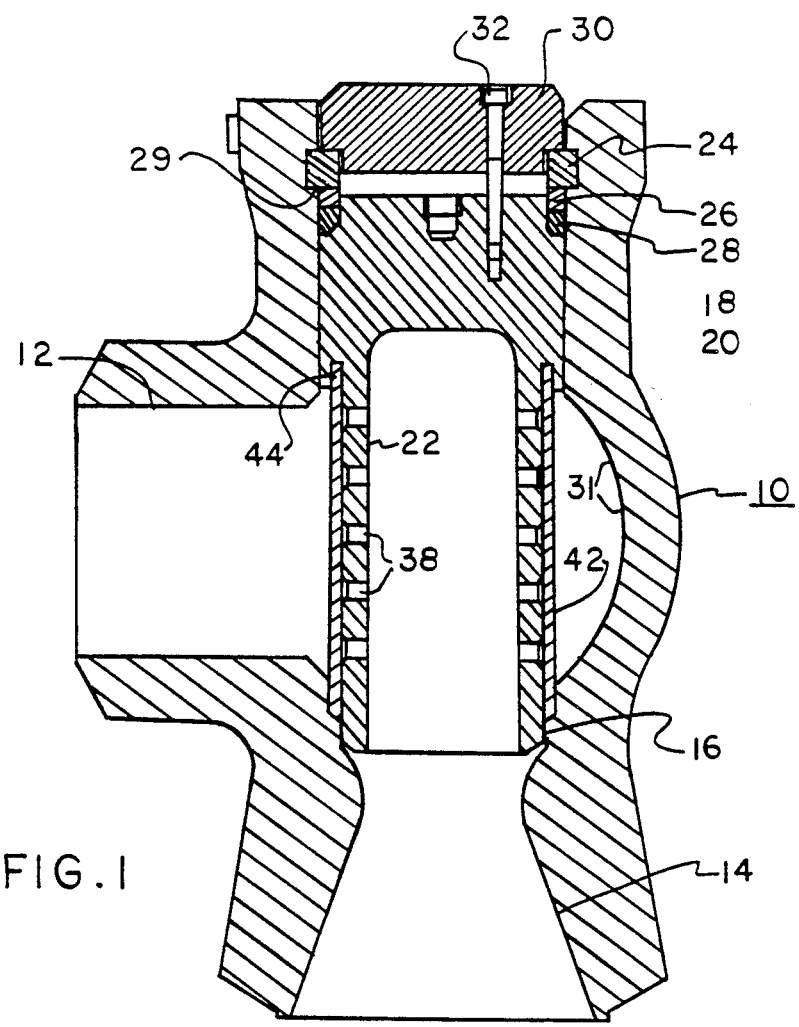
FIG. 1 is a section view of the turbine strainer of the present invention.
Figure 2:
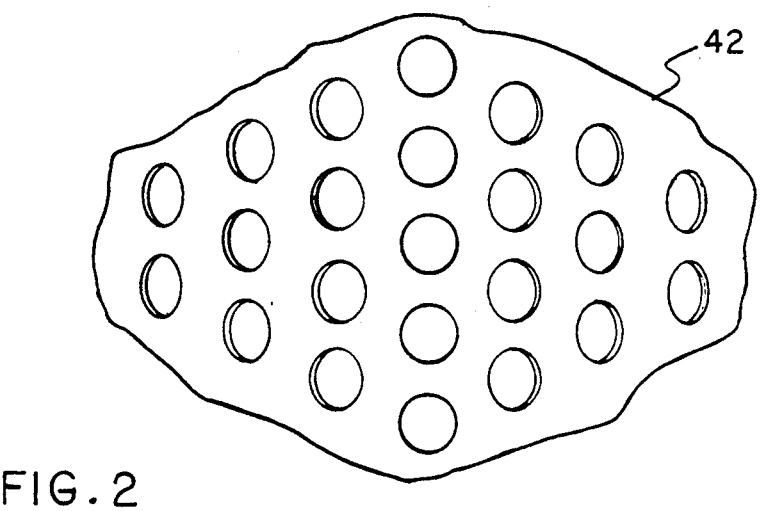
FIG. 2 is an isolated view of the turbine strainer screen of the preferred embodiment.

The present invention is described with reference to the enclosed Figures wherein the same numbers are utilized where applicable. Referring to FIG. 1, a section view of the turbine filter of the present invention is shown. The turbine filter comprises a housing or body 10 having an inlet 12 and perpendicularly extending outlet 14. The inlet 12 is welded to body 10. Outlet 14 expands conically. The inlet and outlets 12, 14 may either be flanged or butt welded. The body 10 is preferably forged. The body 10 may be cast instead of forged. The body 10 may be constructed from low alloyed heat resistance steels, austenitic stainless steel, or a high temperature resistant super alloy. An annular seat 16 separates the inlet and outlet ports.

The body 10 contains an additional orifice 18 for a bonnet assembly 20. The bonnet assembly 20 extends downward and includes a hollow cylindrical bonnet cage 22 which blocks off flow between the inlet and outlet ports. The cylindrical bonnet cage 22 mates with the annular seat and opens into the outlet port. The bonnet is retained in position by a segmented ring 24, distance ring 26 and pressure seal gasket 28. The segmented ring 24 is retained with a groove 29, cut into the body 10. A pre-stress ring 30 pushes down and mates with the segmented ring 24. The pressure seal gasket functions to maintain the internal pressure of the system. A fastener 32 inserted in the pre-stress ring is used to secure the bonnet.

Figure 3:
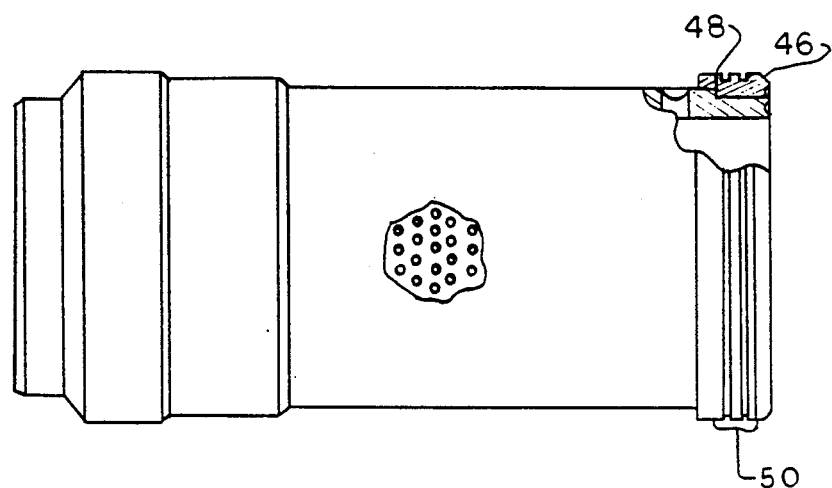
FIG. 3 is a perspective view of the turbine strainer of the preferred embodiment.
Figure 4:
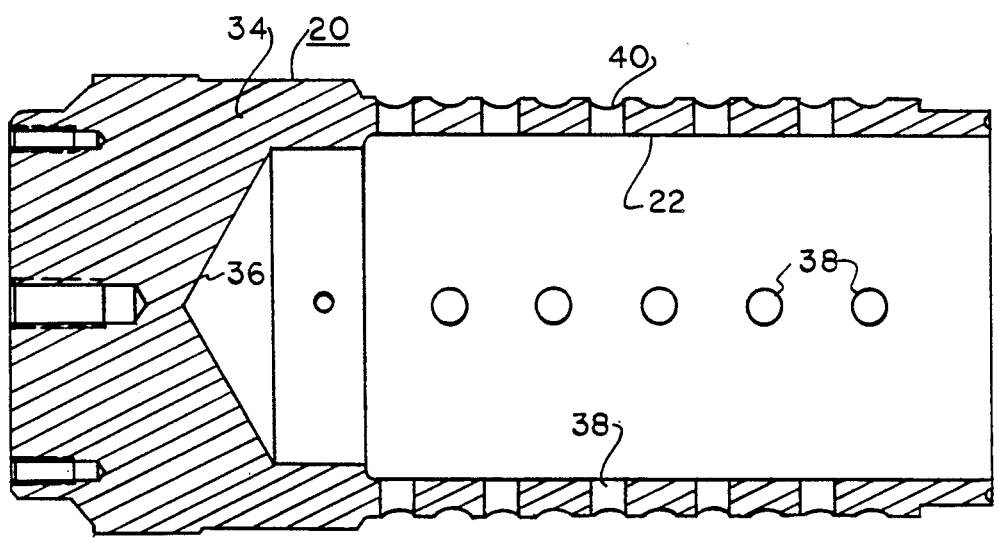
FIG. 4 is a section view of the bonnet assembly of the turbine strainer of the preferred embodiment.

The bonnet assembly and cage is more particularly described with reference to FIGS. 3, 4 and 5. The bonnet assembly 20 may be constructed from steel and comprises an upper bonnet 34 and lower cylindrical cage 22. As noted above, the upper housing is retained in place by segmented ring 24 and pressure seal gasket 28. As can be seen from FIG. 3, the bonnet assembly is hollowed internally in order to form the bonnet cage. The top of the bonnet cage forms a dome 36 which extends into the upper bonnet assembly 34. The dome 36 forms an angle of 120°. The dome 36 serves to reduce the weight of the bonnet, provides a smooth change in wall thickness between the cage and upper bonnet and reduces thermal stress during cyclic operation.

Figure 5:
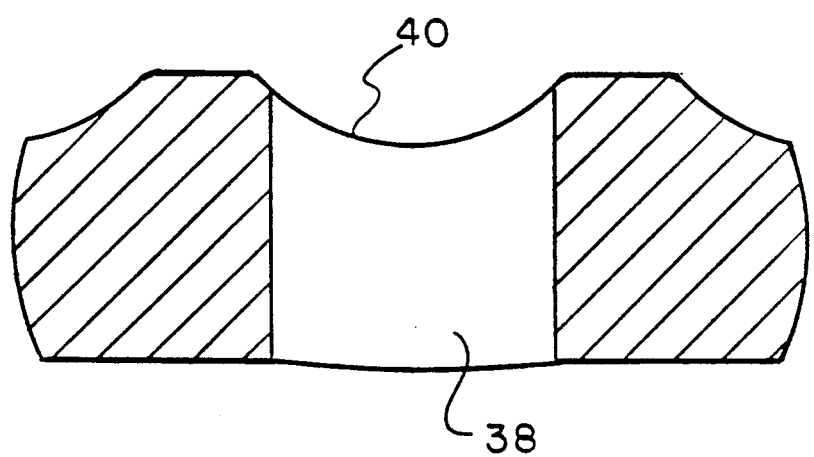
FIG. 5 is a section view of the circumferential grooves for the present invention.

The cylindrical bonnet cage further contains a plurality of apertures 38 and further contains, as shown in FIG. 5, circumferential grooves 40 around the its outside periphery which increase the total free flow area through the screen 42 and thereby reduce pressure loss. The screen 42 is a thin metallic screen which surrounds the cylindrical bonnet cage. The bonnet cage prevents the thin metallic screen from collapsing. As shown in FIGS. 1, 3 and 4, the upper end of the screen is retained by a annular slot 44 cut into the body of the upper bonnet. At the lower end, a sliding ring 46 is inserted over the bonnet cage and screen, and held in place by a stop 48. The sliding ring 46 contains a set of labyrinth grooves 50 which mate with the annular seat and which catch dirt and improve tightness as well as facilitate maintenance.

The operation of the present invention is described with reference to the enclosed figures. As shown in FIG. 1, steam flow enters through the inlet port and enters into the cylindrical cage, via the screen and apertures. The circumferential grooves facilitate total free flow area through the screen and reduce pressure loss. The flow path 31 within the body is curved in order to avoid undesirable turbulences, vortices and pressure losses. The flow then exits through a conically expanding outlet port. Debris and dirt is caught in the screen.

It is to be appreciated that other embodiments fall within the spirit and scope of the present invention. In particular, it would be appreciated by those skilled in the art that other mechanisms can be utilized to attach the bonnet assembly. In addition, different bonnet cages can be utilized in the present invention, each having a different hole patterns in order to facilitate different applications and service conditions.

The present invention has been described with reference to the above preferred embodiment. It is to be appreciated by those skilled in the art that numerous other embodiments fulfill the spirit and scope of the present invention and that the true nature and scope of the present invention should be determined with reference to the claims appended hereto.

What is claimed is:

1. A strainer for removing debris from a turbine comprising:
   a casing having an inlet conduit for introducing a flow medium into said strainer and an outlet conduit extending substantially perpendicular to said inlet conduit for expelling said flow medium, said outlet conduit having conically expanding interior side walls;
   an annular seal affixed to said casing between said inlet and outlet conduits for forming a seal between said inlet and outlet conduits;
   a bonnet attached to said casing, said bonnet having an upper bonnet section affixed to said casing and hollow cylindrical lower bonnet cage for mating with said annular seat, said hollow cylindrical lower bonnet cage opening into said outlet conduit and containing a plurality of apertures so as to permit flow from said inlet conduit into said hollow cavity and out said outlet conduit; and
   strainer screen means surrounding said hollow cylindrical lower bonnet cage, said screen means preventing debris from entering said apertures.

2. The strainer of claim 1 wherein the top of said lower bonnet forms a dome which extends into said upper bonnet assembly, said dome reducing the weight of said bonnet and further providing a smooth change in wall thickness between said lower bonnet cage and upper bonnet section.

3. The strainer of claim 1 wherein said dome forms an angle of 120°.

4. The strainer of claim 1 wherein the outside of said bonnet cage contains circumferential grooves which increase total free flow area.

5. The strainer of claim 1 wherein said lower bonnet cage mates with said annular seal by means of a sliding ring, said sliding ring containing labyrinth grooves for catching dirt and debris.

6. A strainer for removing debris from a turbine comprising:
   a casing having an inlet conduit for introducing a flow medium into said strainer and a conically expanding outlet conduit extending substantially perpendicular to said inlet conduit for expelling said flow medium, said outlet conduit having conically expanding interior side walls;
   an annular seal affixed to said casing between said inlet and outlet conduits for forming a seal between said inlet and outlet conduits;
   a bonnet attached to said casing, said bonnet having an upper bonnet section affixed to said casing and hollow cylindrical lower bonnet cage for mating with said annular seat, said hollow cylindrical lower bonnet cage opening into said outlet conduit and having a plurality of apertures so as to permit flow from said inlet conduit into said hollow cavity and out said outlet conduit, the outer walls of said cage containing circumferential grooves which increase total free flow area; and
   strainer screen means surrounding said hollow cylindrical lower bonnet, said screen means preventing debris from entering said apertures.

7. The strainer for removing debris from a turbine of claim 6 wherein said lower bonnet cage prevents said screen from collapsing.

8. The strainer of claim 6 wherein said lower bonnet cage mates with said annular seal by means of a sliding ring, said sliding ring containing labyrinth grooves for catching dirt and debris.

9. A strainer for removing debris from a turbine comprising:
   a casing having an inlet conduit for introducing a flow medium into said strainer and an outlet conduit extending substantially perpendicular to said inlet conduit for expelling said flow medium, said outlet conduit having conically expanding interior side walls;
   an annular seal affixed to said casing between said inlet and outlet conduits for forming a seal between said inlet and outlet conduits;
   a bonnet attached to said casing, said bonnet having an upper bonnet section affixed to said casing and hollow cylindrical lower bonnet cage for mating with said annular seat, said lower bonnet cage mating with said annular seal by means of a sliding ring, said sliding ring containing labyrinth grooves for catching dirt and debris, said hollow cylindrical lower bonnet cage opening into said outlet conduit and having a plurality of apertures so as to permit flow from said inlet conduit into said hollow cavity and out said outlet conduit; and
   strainer screen means surrounding said hollow cylindrical lower bonnet, said screen means preventing debris from entering said apertures.

10. The strainer for removing debris from a turbine of claim 9 wherein said lower bonnet cage prevents said screen from collapsing.

11. The strainer of claim 9 wherein the top of said lower bonnet forms a dome which extends into said upper bonnet assembly.

12. The strainer of claim 11 wherein said dome forms an angle of 120°.

* * * * *